United States Patent
Bathon et al.

(10) Patent No.: US 6,244,620 B1
(45) Date of Patent: Jun. 12, 2001

(54) STEERING WHEEL WITH AIRBAG MODULE

(75) Inventors: Michael Bathon, Stockstadt; Jürgen Burgard, Hösbach; Jürgen Krebs, Aschaffenburg; Kurt Kullmann, Sulzbach, all of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/545,304

(22) Filed: Apr. 7, 2000

(30) Foreign Application Priority Data

Apr. 9, 1999 (DE) .......................................... 299 06 377 U

(51) Int. Cl.$^7$ .................................................. B60R 21/22
(52) U.S. Cl. .................. 280/731; 280/728.2; 280/728.3; 200/61.55
(58) Field of Search ............................... 280/728.2, 731, 280/728.3, 728.1; 200/61.54, 61.55

(56) References Cited

U.S. PATENT DOCUMENTS

| 5,333,897 | 8/1994 | Landis et al. . |
| 5,584,501 | * 12/1996 | Walters ................................ 280/731 |
| 5,627,352 | * 5/1997 | Suzuki et al. ...................... 200/61.54 |

FOREIGN PATENT DOCUMENTS

| 4140275 | 6/1992 | (DE) . |
| 19630725 | 2/1998 | (DE) . |
| 19725684 | 12/1998 | (DE) . |
| 5-238341 | * 9/1993 | (JP) ................................ 280/728.2 |

* cited by examiner

*Primary Examiner*—Eric Culbreth
(74) *Attorney, Agent, or Firm*—Tarolli, Sundheim, Covell, Tummino & Szabo L.L.P.

(57) ABSTRACT

The invention relates to a steering wheel for motor vehicles, the steering wheel comprising a steering wheel axis, a skeleton surrounded by a foam casing, and an airbag module. The airbag module has a generator support connected with the skeleton and a covering cap fastened to the generator support. The covering cap is designed as an actuating device for generating a horn signal. At least two recesses are provided in the foam casing of the steering wheel skeleton and on the generator support insert pins are provided corresponding to the recesses. The pins have axes aligned parallel to the steering wheel axis. Further, the pins serve for centering the covering cap relative to the foam casing of the steering wheel skeleton in a plane perpendicular to the steering wheel axis.

10 Claims, 4 Drawing Sheets

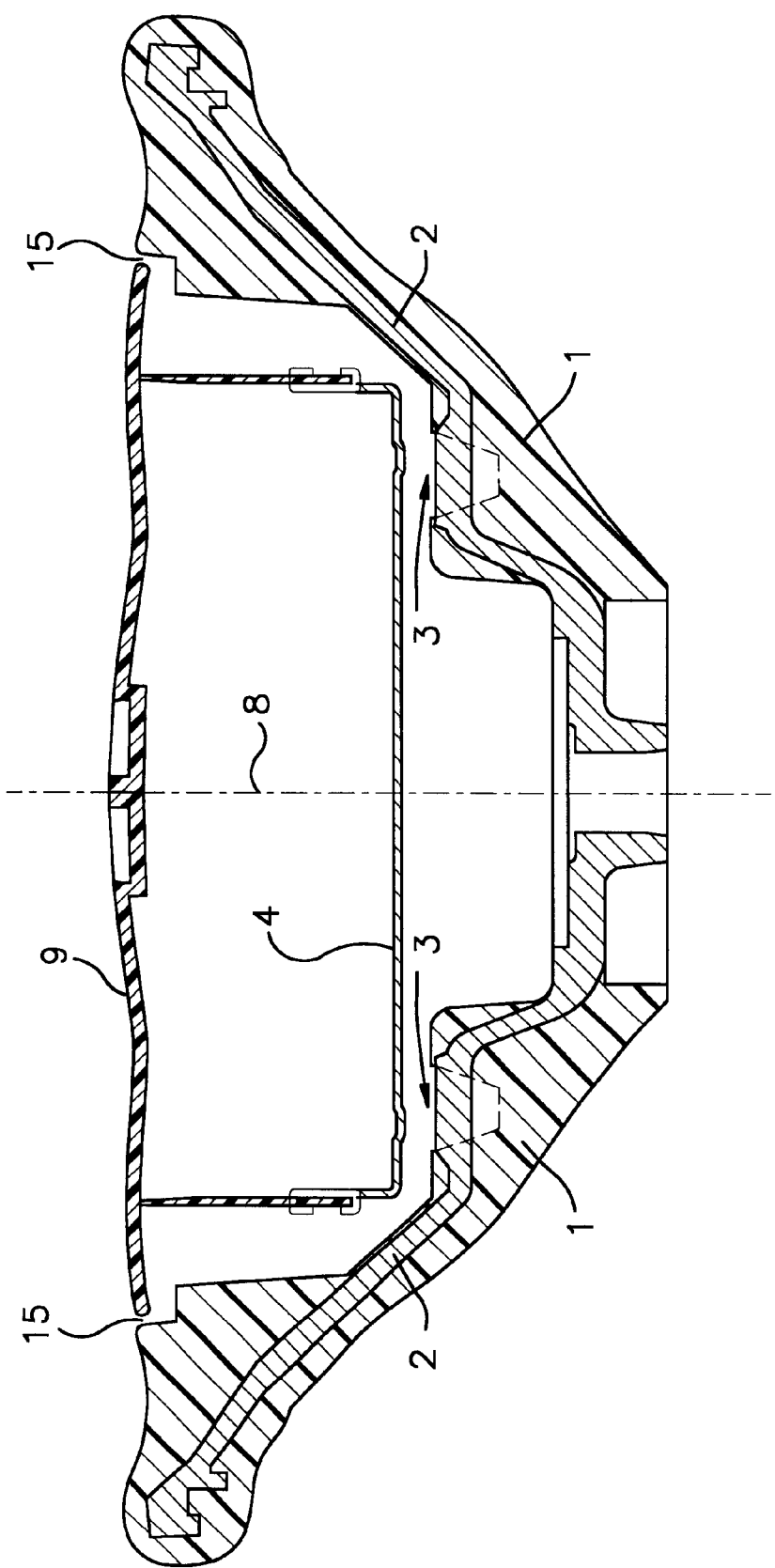

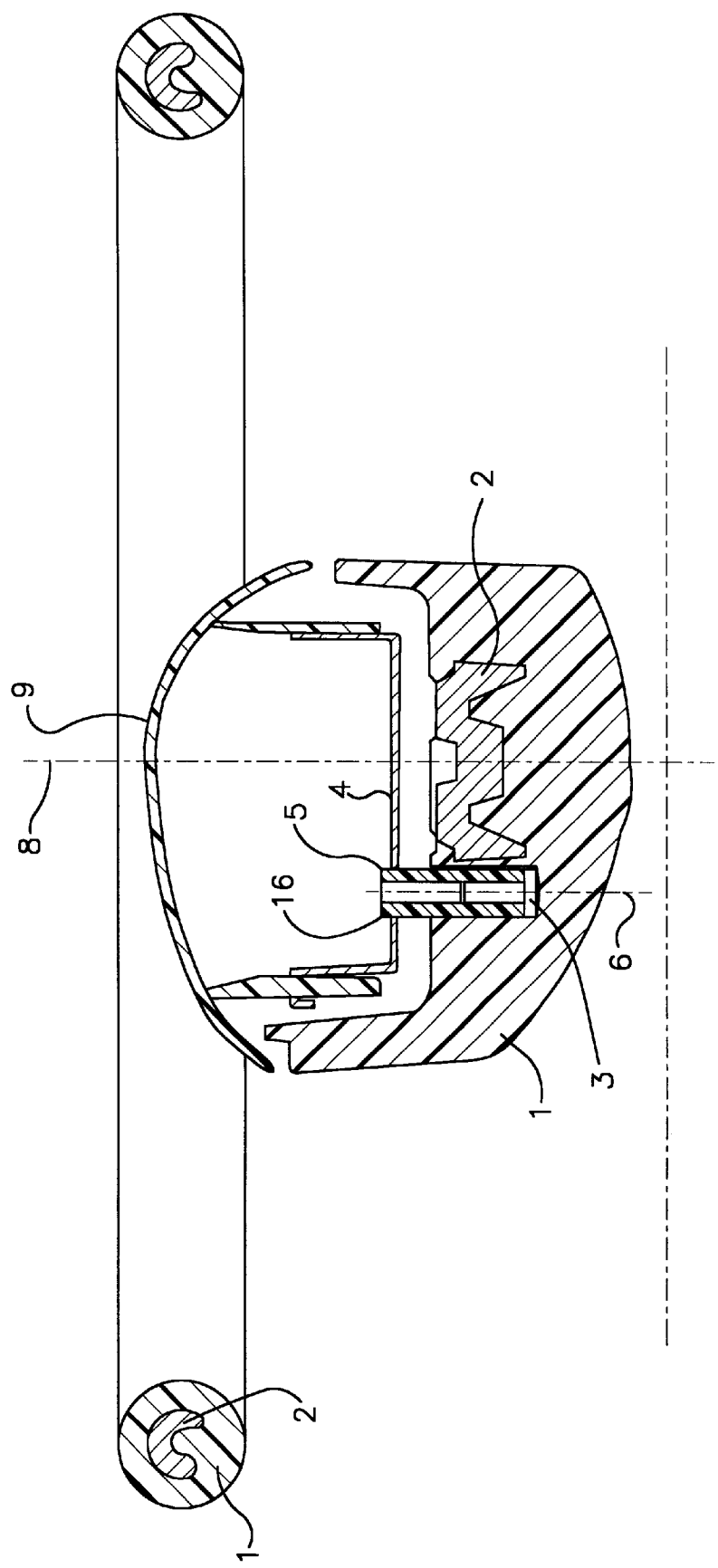

STEERING WHEEL WITH AIRBAG MODULE

TECHNICAL FIELD

The invention relates to a steering wheel for motor vehicles.

BACKGROUND OF THE INVENTION

In known steering wheels comprising a cover cap and a foam casing an expansion joint must be provided between the covering cap and the adjoining foam casing in order to avoid complicated embodiments in which the steering wheel covering cap is integrated into the steering wheel casing and is produced in one piece therewith. The covering cap is movably arranged against a restoring force in the direction of the steering wheel axis for the generation of a horn signal.

In many known embodiments with a separate covering cap, it is difficult and under certain circumstances involves considerable effort, to produce the unavoidable expansion joint between covering cap and steering wheel casing so as to be equally wide throughout, because in this respect the manufacturing tolerances in the manufacture of the steering wheel casing, the covering cap and all the components involved for the fastening of the airbag module to the steering wheel can add up in the most unfavorable case. This leads in practice to expansion joints having distinctly different widths, which are visually unappealing and can not be accepted.

The problem therefore exists of making provision that the width of the unavoidable expansion joints can be maintained within close limits and that the possible accumulation of the manufacturing tolerances can not visually impair in a disadvantageous manner the association between the covering cap and steering wheel casing. The solution which is sought is to lie structurally and financially within the framework of techniques used hitherto, is not to require any additional space and is to be able to be carried out as easily and reliably as possible.

BRIEF SUMMARY OF THE INVENTION

The invention provides a steering wheel where correct positioning of the covering cap relative to the steering wheel casing may be done in a simple and easy manner. This is achieved in a steering wheel which comprises a steering wheel axis, a skeleton surrounded by a foam casing, and an airbag module. The airbag module has a generator support connected with the skeleton and a covering cap fastened to the generator support. The covering cap is designed as an actuating device for generating a horn signal. At least two recesses are provided in the foam casing of the steering wheel skeleton. On the generator support, insert pins are provided corresponding to the recesses. The pins have axes aligned parallel to the steering wheel axis. Further, the pins serve for centering the covering cap relative to the foam casing of the steering wheel skeleton in a plane perpendicular to the steering wheel axis.

Through the steps according to the invention, the positioning of the airbag module and hence of the covering cap can be ensured independently of the actual fastening of the airbag module on the steering wheel, without a majority of manufacturing tolerances having an influence on this. The fastening of the airbag module to the steering wheel skeleton can be freed of the partial objective of "positioning" and can be configured such that it does not influence the positioning according to the invention by means of recesses in the foam casing and insert pins on the generator support. In other words, the positioning of the covering cap in the plane perpendicular to the steering wheel axis and relative to the foam casing of the steering wheel skeleton is no longer carried out by means of the fastening of the airbag module, but rather substantially more directly by means of the foam casing of the steering wheel skeleton and in particular through insert pins arranged on the generator support, which can be arranged without great effort on the generator support, so that between them and the covering caps, likewise fastened to the generator support, only a small number of manufacturing tolerances, which moreover can be maintained in very close limits, can have an influence on the positioning between the covering cap and the foam casing of the steering wheel skeleton.

BRIEF DESCRIPTION OF THE DRAWINGS

FIG. 2 shows a section through the steering wheel according to FIG. 1 along the line 2—2;

FIG. 3 shows a section through the steering wheel according to FIG. 1 along the line 3—3;

DETAILED DESCRIPTION OF THE PREFERRED EMBODIMENTS

Figure 1:
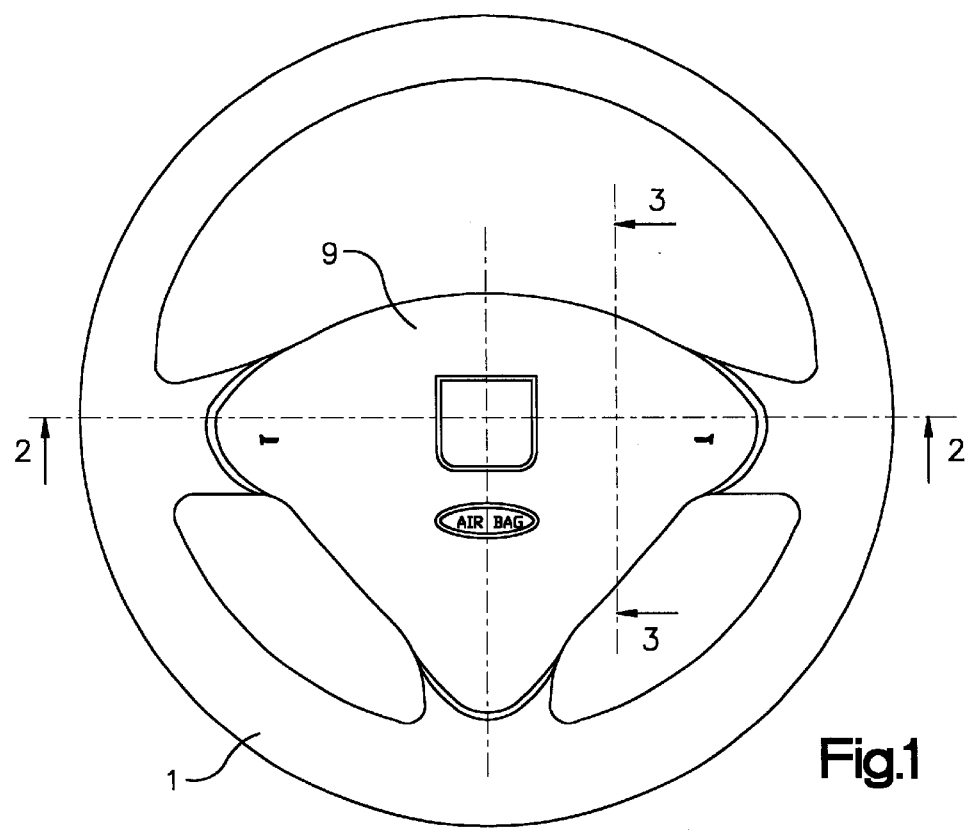
FIG. 1 shows a view of a steering wheel skeleton, encased in foam, with a covering cap for an airbag module according to the invention.

From the elevation illustration of a steering wheel according to FIG. 1, its foam casing 1 and also the covering cap 9 of the airbag module can be seen. The covering cap has two horn symbols, in order to point out to the user that the covering cap 9 must be used to actuate the vehicle horn. In addition, the position of the sections 2—2 and 3—3 can be seen from FIG. 1.

From the sectional illustration according to FIG. 2, the position of the airbag module can be seen with generator support 4 and covering cap 9 relative to the steering wheel skeleton 2 and to its foam casing 1, respectively. The entire airbag module is connected with the steering wheel skeleton 2 so as to be displaceable downwards against a restoring force approximately parallel to the steering wheel axis 8, in order to be able to actuate one or more horn contacts. From FIG. 2 it can be seen in addition that between the edge of the covering cap 9 and the foam casing 1 of the steering wheel skeleton 2, an expansion joint 15 is provided, which—as explained in the introduction—is to be equally wide throughout. For this, it is necessary to position the covering cap 9 precisely in a plane perpendicular to the steering wheel axis 8 relative to the foam casing 1.

In the sectional illustration 3—3 according to FIG. 3, again the foam casing and the steering wheel skeleton are designated by 1 and 2, respectively. The covering cap again has the reference number 9 and the steering wheel axis the reference number 8. According to the invention, a recess 3 is provided in the foam casing 1, into which an insert pin 5 engages which is connected with the generator support 4.

Through the generator support in turn, the covering cap 9 is positioned precisely in the plane perpendicular to the steering wheel axis 8. As it is not the steering wheel skeleton 2, but rather the foam casing 1 which is used for the formation of a positioning aid in the form of recesses 3, and on the other hand the counter-pieces of the positioning aid are arranged on the generator support 4 with the insert pins 5, the positioning of the covering cap 9 relative to the foam casing 1 can be effected independently of the manufacturing tolerances of the fastening means, which are necessary for the connection of the airbag module with the steering wheel skeleton and which must be designed for considerable reaction forces on release of the airbag. The insert pins are made of plastic. The insert pins are fastened to the support by injection molding. The generator support 4, includes an injection molding site 16.

Figure 4:
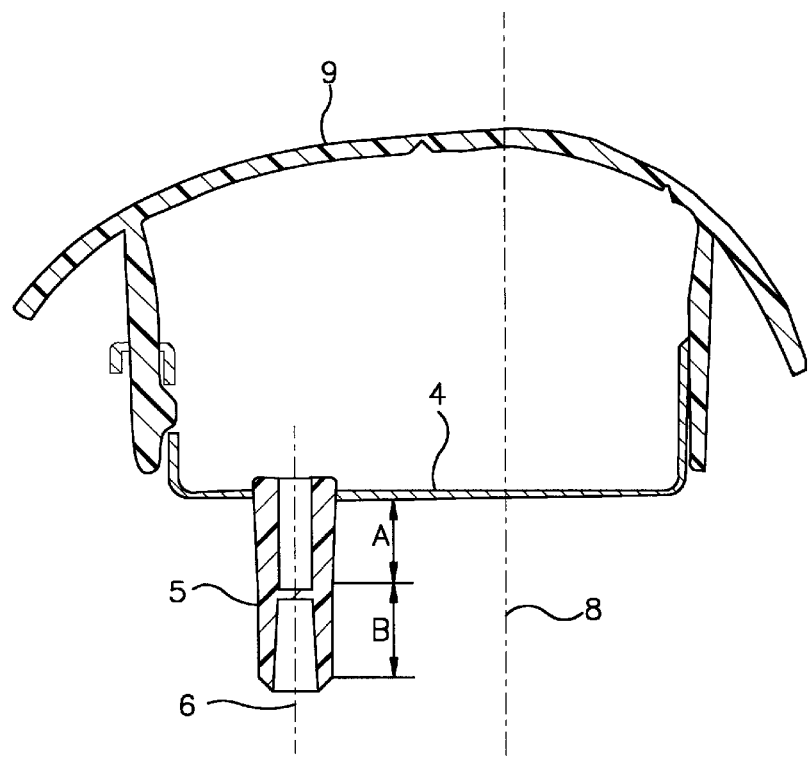
FIG. 4 shows an enlarged illustration of a part of FIG. 3.

From FIG. 4, once again in enlarged illustration, a section can be seen through the generator support 4, the covering cap 9 and the insert pin 5, the axis 6 of which runs parallel to the axis 8 of the steering wheel. Further, the insert pin 5 as shown in FIG. 4 is divided in two sections A and B. Insert pin 5 tapers conically across section A, starting from its first end on the generator carrier 4. The tapering of the insert pin supports removing the insert pin from a molding tool (not shown). The insert pin has a constant diameter across section B serving as a guiding portion which is to be received in the recess 3. At the lower end of the insert pin with respect to FIG. 4, there is provided a bevel which serves as a leading-in means during inserting the pin 5 into recess 3.

Figure 5:
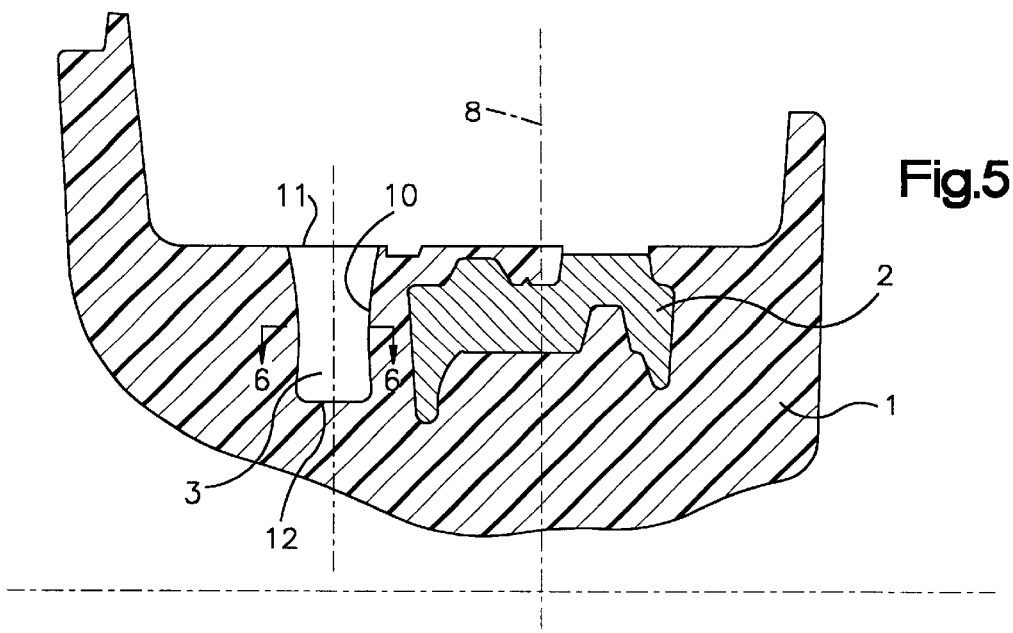
FIG. 5 shows an enlarged illustration of another part of FIG. 3.

Likewise, from FIG. 5 an enlarged illustration can be seen of the sectional illustration of the steering wheel region with the recess 3 in the foam casing 1. The steering wheel skeleton is designated by 2 and the axis of the steering wheel is designated again by 8. The recess 3 has a cross-section which is firstly reduced from the inlet end 11 towards its base 12 and is thereafter widened again, whereby a certain tilting movement of the covering cap 9 relative to the foam casing 1 and to the steering wheel skeleton, respectively, is possible about the inwardly projecting beads 10 (cf. FIG. 6). The beads extend the length of the recesses. As the fastening means are designed such that on the one hand they can receive the reaction forces on an activation of the airbag, but on the other hand they must allow a relative movement between airbag module and steering wheel in the direction of the steering wheel axis 8 and have no influence on the positioning of the covering cap 9 in the plane perpendicular to the steering wheel axis, they must be designed such that with a pressure on one side onto the covering cap 9 also a certain tilting movement of the airbag module relative to the steering wheel is possible. Accordingly, the positioning means, recess 3 and insert pin 5 are also designed such that the positioning in the plane perpendicular to the steering wheel axis 8 does not hinder a slight tilting movement.

Figure 6:
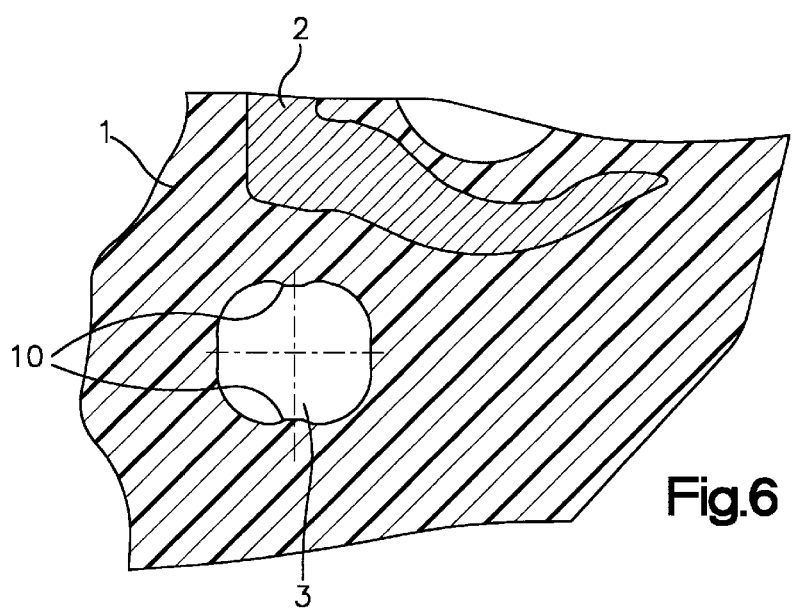
FIG. 6 shows a section through the part according to FIG. 5 along the line 6—6.

From the further enlarged illustration according to FIG. 6, the cross-sectional design of the recess 3 can be seen with its inwardly projecting beads 10, whereby the necessary positioning of the covering cap 9 relative to the foam casing 1 of the steering wheel skeleton 2 can be limited to relatively small contact surfaces.

Figures 7A, 7B:
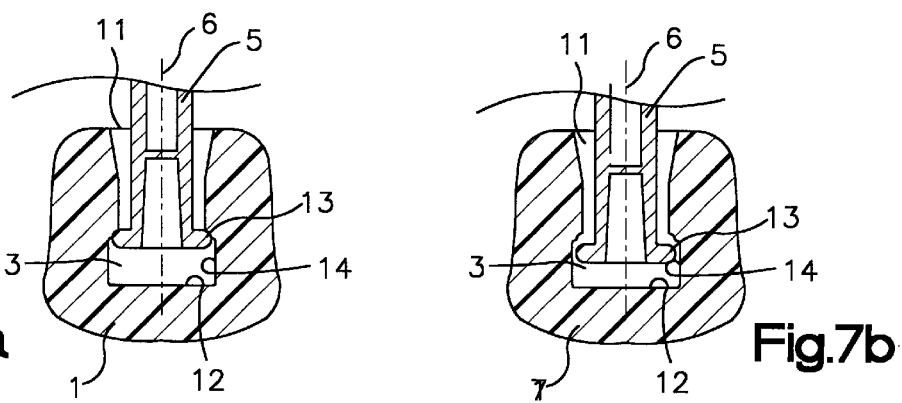
FIG. 7a shows a modified embodiment of the recess and of the insert pin in two different positions.
FIG. 7b shows a modified embodiment of the recess and of the insert pin in two different positions.

FIG. 7 further shows a possible modification of the recesses 3 and insert pins 5. Adjoining the base 12, the recess 3 has an undercut 14 in the foam casing 1, which undercut 14 is able to be realized by a casting technique without complicated multipart molds and sliders, because the finished hardened material of the foam casing 1 is sufficiently elastic to readily be able to draw out from the recess 3 the mold cores with which the undercut 14 is formed. The inlet end of the recess 3 is again designated by 11 and the axis of the insert pin 5 is designated by 6. This insert pin 5 has at its lower end one or more radially outwardly directed projections 13 or one radially outwardly directed, surrounding projection 13, with which it can engage into the undercut 14 of the recess 3. From the right-hand side of the illustration in FIGS. 7a and 7b, it can be seen that the undercut 14 is constructed to be so high that the insert pin 5 is downwardly displaceable relative to the foam casing 1 at least by the extent which is necessary for actuation of the otherwise arranged horn contacts.

What is claim is:

1. A steering wheel for motor vehicles, said steering wheel comprising a steering wheel axis, a skeleton surrounded by a foam casing, and an airbag module which has a generator support and has a covering cap fastened to said generator support, said airbag module being displaceable approximately parallel to the steering wheel axis for generating a horn signal, at least two recesses being provided in said foam casing of said steering wheel skeleton and on said generator support, insert pins being provided corresponding to said recesses, said pins having axes aligned parallel to said steering wheel axis, said pins serving for centering said covering cap relative to said foam casing of said steering wheel skeleton in a plane perpendicular to said steering wheel axis.

2. The steering wheel according to claim 1, wherein said pins are inserted into said recesses and are in direct contact with said foam casing.

3. The steering wheel according to claim 1, wherein said insert pins consist of plastic and are fastened to said generator support by injection molding.

4. The steering wheel according to claim 3, wherein said insert pins include a circular cross-section and comprise a first end corresponding to an injection-molding site on said generator support, a second end located opposite said first end, as well as a longitudinal section disposed between said first and second ends, an external diameter of said first end firstly reducing conically towards said second end and then remaining constant across said longitudinal section.

5. The steering wheel according to claim 4, wherein said insert pins are provided with a bevel at said second end.

6. The steering wheel according to claim 1, wherein said insert pins are constructed so as to be of hollow cylindrical shape.

7. The steering wheel according to claim 1, wherein said recesses in said foam casing have an overall length and a substantially circular cross-section and are provided with several inwardly projecting beads which extend substantially over said overall length of said recesses.

8. The steering wheel according to claim 7, wherein said recesses have an inlet end and a base and have a cross-section firstly reducing from said inlet end towards said base and thereafter widening again, so that said beads, viewed in longitudinal section, have a convex lateral delimitation with a minimal transverse gap approximately in a center between said inlet end and said base of said recess.

9. The steering wheel according to claim 1, wherein said insert pins include a second end, said second end having at least one radially outwardly directed projection and wherein said recesses adjoining said base are provided with an undercut into which said projections can engage.

10. The steering wheel according to claim 9, wherein said radially outwardly directed projection is an annularly surrounding projection.

* * * * *